United States Patent
Pruvost et al.

(10) Patent No.: US 9,762,276 B2
(45) Date of Patent: Sep. 12, 2017

(54) WIRELESS TRANSMISSION SYSTEM

(75) Inventors: Sébastien Pruvost, Froges (FR);
Samuel Foulon, Grenoble (FR);
Christophe Loyez, Festubert (FR);
Nathalie Rolland, Villeneuve-d'Ascq (FR)

(73) Assignee: STMicroelectronics SA, Montrouge (FR)

(*) Notice: Subject to any disclaimer, the term of this patent is extended or adjusted under 35 U.S.C. 154(b) by 378 days.

(21) Appl. No.: 13/490,909

(22) Filed: Jun. 7, 2012

(65) Prior Publication Data
US 2012/0314813 A1 Dec. 13, 2012

(51) Int. Cl.
*H03C 3/00* (2006.01)
*H03K 7/06* (2006.01)
*H04L 27/12* (2006.01)
*H04B 1/30* (2006.01)
*H04B 1/24* (2006.01)

(52) U.S. Cl.
CPC ............... *H04B 1/30* (2013.01); *H04B 1/24* (2013.01)

(58) Field of Classification Search
None
See application file for complete search history.

(56) References Cited

U.S. PATENT DOCUMENTS

| | | | |
|---|---|---|---|
| 4,903,033 A | 2/1990 | Tsao et al. | |
| 5,922,061 A * | 7/1999 | Robinson | 710/109 |
| 7,065,125 B1 * | 6/2006 | Miller | H04B 1/707 375/130 |
| 2005/0104603 A1 * | 5/2005 | Peschmann | G01V 5/0016 324/637 |
| 2005/0162338 A1 * | 7/2005 | Ikeda | G09G 5/006 345/2.1 |

FOREIGN PATENT DOCUMENTS

| | | | | |
|---|---|---|---|---|
| EP | 1 821 418 A2 | 8/2007 | | |
| EP | 1821418 A2 * | 8/2007 | ............... | H04B 1/24 |
| JP | 2003273763 A | 9/2003 | | |

OTHER PUBLICATIONS

Meel et al., Spread Spectrum (SS), Oct. 1999, Vlaams Instituut voor de bevordering van het Wetenschappelijk Technologisch onderzoek in de industrie—(Flemisch Gouverment).*
Meel et al., Spread Spectrum (SS), Oct. 1999, Vlaams Instuut Voor de bevordering Van het Wetenschappelijk Technologisch Onderzoek in de insdustrie.*
Meel et al.. Spread Spectrum (SS), Oct. 1999, Vlaams Instituut Voor de Bevordering Van Het Wetenschappeijk Technologish Onderzoek in de Industrie.*
French Search Report and Written Opinion dated Feb. 29, 2012 from corresponding French Application No. 11/54998.

* cited by examiner

*Primary Examiner* — Wednel Cadeau
(74) *Attorney, Agent, or Firm* — Slater Matsil, LLP

(57) ABSTRACT

A wireless data transmitter including: a data modulator adapted to modulate a data signal based on a frequency signal; and at least one antenna adapted to wirelessly transmit the modulated data signal and the frequency signal independently.

8 Claims, 3 Drawing Sheets

WIRELESS TRANSMISSION SYSTEM

CROSS REFERENCE TO RELATED APPLICATIONS

This application claims the priority benefit of French patent application number 11/54998, filed on Jun. 8, 2011, entitled WIRELESS TRANSMISSION SYSTEM, which is hereby incorporated by reference to the maximum extent allowable by law.

BACKGROUND

Technical Field

The present invention relates to the field of wireless data transmission, and in particular to wireless data transmission by modulation based on a carrier frequency signal.

Discussion of the Related Art

FIG. 1 illustrates a wireless data transmission system 100 comprising a transmission side 102 and a reception side 104. This topology is known as a homodyne or direct conversion technique. On the transmission side 102, a local oscillator 106 (LO), usually based on a phase locked loop (PLL) 108, generates a frequency signal $f_{LO}$. The frequency signal $f_{LO}$ is provided to a data modulator 110 (IQ MOD), which receives a data signal comprising I (in phase) and Q (in quadrature) components. Data modulator 110 modulates the data signal based on the frequency signal $f_{LO}$. The output modulated signal S(t) is then transmitted via an antenna 112.

On the receive side 104, a receive antenna 114 receives the modulated data signal S'(t), and provides it to a data demodulator 116 (IQ DEMOD). Demodulator 116 demodulates the data signal based on a frequency signal $f'_{LO}$ provided by local oscillator 118, which mainly comprises a carrier recovery block. The purpose of the carrier recovery block is to synchronize the frequency signal $f'_{LO}$ with the carrier frequency of the signal S'(t) in both frequency and phase. For this, a first few data blocks of the data signals I' and Q', estimated based on the receive signal S'(t), are provided to an analog-to-digital converter 120 (ADC), which generates digitalized data signals I' and Q', in turn provided to a digital processing block 122. Block 122 for example corresponds to a Costa loop, and outputs a correction signal on a line 124, which is proportional to the frequency/phase difference between the signals $f'_{LO}$ and S'(t), in a similar manner to a frequency/phase locked loop. The first few blocks of the I' and Q' data cannot generally be correctly demodulated and only form a preamble used for synchronization.

A problem with the transmission system 100 of FIG. 1 is that a local oscillator is needed on both the transmission and the reception sides, and in order to ensure successful data transmission, the frequency signals $f_{LO}$ and $f'_{LO}$ have to be well synchronized. At relatively high frequencies this is difficult, as the phase noise and frequency instability of the frequency signal $f_{LO}$, increase by a squared relation to its frequency. Furthermore, the phase locked loop 108 on the transmission side, and the ADC 120 and digital decoding circuitry 122 on the reception side add complexity, energy consumption and cost to the transmission system.

SUMMARY

According to one embodiment, there is provided a wireless data transmitter comprising: a local oscillator adapted to generate an initial frequency signal; a signal modulator adapted to generate a frequency signal by modulating said initial frequency signal based on a code signal; a data modulator adapted to modulate a data signal based on said frequency signal; and at least one antenna adapted to wirelessly transmit said modulated data signal and said frequency signal independently.

According to one embodiment, said data signal comprises I and Q quadrature components.

According to another embodiment, said at least one antenna is adapted to transmit said modulated signal using a first type of polarization, and said frequency signal using a second type of polarization different to said first polarization.

According to another embodiment, said first type of polarization is one of horizontal and vertical polarization, and said second type of polarization is the other of horizontal and vertical polarization.

According to another embodiment, said first type of polarization is one of clockwise and anti-clockwise circular polarization, and said second type of polarization is the other of clockwise and anti-clockwise circular polarization.

According to another embodiment, said at least one antenna is formed on a single antenna patch.

According to another embodiment, said at least one antenna comprises a first antenna adapted to wirelessly transmit said modulated data signal and a second antenna adapted to wirelessly transmit said frequency signal.

According to another embodiment, there is provided a wireless data receiver, comprising at least one antenna adapted to receive a modulated data signal and a frequency signal, the frequency signal corresponding to an initial frequency signal modulated based on a code signal; and a data demodulator adapted to receive said modulated data signal and said frequency signal from said at least one antenna, and to demodulate said data signal based on said frequency signal.

According to another embodiment, there is provided a wireless data transmission system comprising the above receiver and data transmitter.

According to another embodiment, there is provided an electronic device comprising first and second chips adapted to communicate with each other via the above data transmission system.

According to another embodiment, there is provided a method of wireless data transmission comprising: generating by a local oscillator an initial frequency signal; generating by a signal modulator a frequency signal by modulating said initial frequency signal based on a code signal; modulating by a data modulator a data signal based on said frequency signal; and wirelessly transmitting said modulated data signal and said frequency signal via at least one antenna.

According to another embodiment, the method further comprises, prior to modulating said data signal, generating by a local oscillator an initial frequency signal and generating by a signal modulator said frequency signal by modulating a code signal based on said initial frequency signal.

According to another embodiment, there is provided a method of wireless data reception, comprising: receiving, via at least one antenna, a modulated data signal and a frequency signal, the frequency signal corresponding to an initial frequency signal modulated based on a code signal; and demodulating said modulated data signal based on said frequency signal.

According to another embodiment, said at least one antenna comprises a first antenna adapted to receive said modulated data signal and a second antenna adapted to receive said frequency signal.

BRIEF DESCRIPTION OF THE DRAWINGS

The foregoing and other purposes, features, aspects and advantages of the embodiments of the present disclosure will become apparent from the following detailed description of embodiments, given by way of illustration and not limitation with reference to the accompanying drawings, in which.

DETAILED DESCRIPTION

Figure 2:
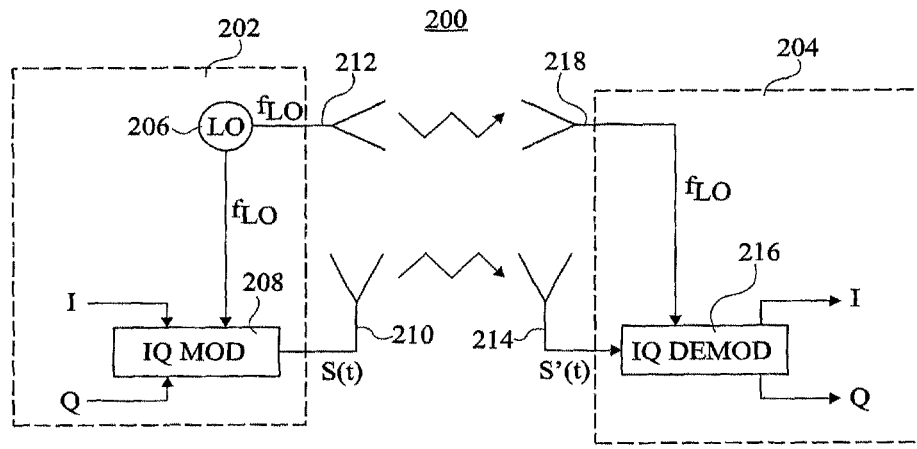
FIG. 2 illustrates a data transmission system according to one embodiment.

FIG. 2 illustrates a wireless data transmission system 200 comprising a transmission side 202 and a reception side 204.

Figure 1:
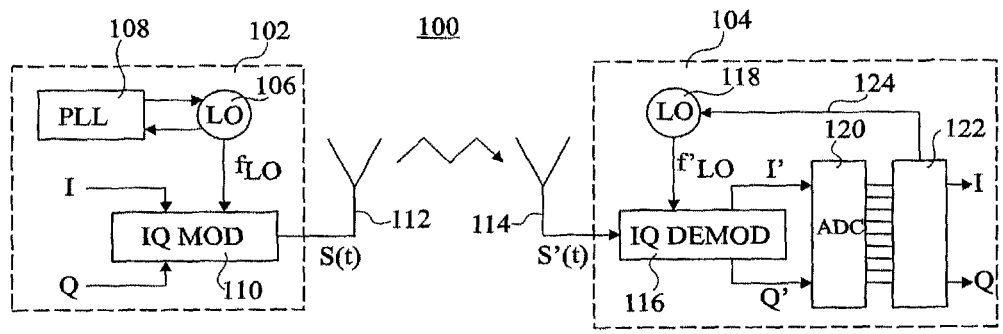
FIG. 1 (described above) illustrates an embodiment of a data transmission system.

The transmission side 202 comprises a local oscillator 206. However, unlike the transmission system 100 of FIG. 1, there is no phase locked loop on the transmission side, the local oscillator generating a frequency signal $f_{LO}$ that may vary to some extent in time. The local oscillator 206 is for example implemented by a free-running VCO (voltage controlled oscillator), and for example does not use a quartz oscillator or other type of high precision oscillator or time reference.

The frequency signal $f_{LO}$ is provided to a data modulator 208. Modulator 208 modulates a data signal, which comprises I and Q components, based on the frequency signal $f_{LO}$, to provide a modulated data signal S(t), which is transmitted via an antenna 210. Furthermore, the frequency signal $f_{LO}$ is provided from the local oscillator 206 to a second antenna 212, for wireless transmission separately from the transmission of the modulated data signal.

On the reception side 204, the modulated data signal S'(t) is received via an antenna 214, and provided to a data demodulator 216. In parallel, an antenna 218 receives the frequency signal $f_{LO}$, which is also provided to the data demodulator 216. Based on the frequency signal $f_{LO}$, the modulated data signal S'(t) is demodulated to provide output data signals I and Q. Thus, for example, no local oscillator is present on the reception side. Furthermore, given that the same frequency signal $f_{LO}$ is used to modulate and demodulate the data signal, the ADC 120 and digital circuitry 122 of FIG. 1 can be omitted.

The frequency signal $f_{LO}$ is for example in the range of 1 to several hundred GHz, or even to several terahertz.

The antenna pairs 212/218 and 210/214 use different forms of transmission, which enables their transmission paths to be relatively independent from each other. There is for example an attenuation of at least 3 dB between the wireless transmission path provided from antenna 210 to antenna 214 and the wireless transmission path that may be present between antenna 210 and antenna 218. Similarly, there is for example an attenuation of at least 3 dB between the wireless transmission path provided from antenna 212 to antenna 218 and the wireless transmission path that may be present between antenna 212 and antenna 214. In some cases, an attenuation of 20 dB between these transmission paths is provided, which ensures a very limited interference.

Independence between the transmission paths can be achieved for example by transmitting the signals via each antenna using different polarizations. For example, the communication via antennas 210, 214 uses horizontal polarization, and the communication via antennas 212, 218 uses vertical polarization, or vice versa. Alternatively, the communication via antennas 210 and 214 uses clockwise circular polarization, and the communication via antennas 212, 218 uses counter-clockwise circular polarization, or vice versa. Alternatively, selectivity between the transmission channels could be achieved by a physical separation of the antennas, to limit any cross-coupling, and/or by directional control of the transmission from each antenna, in the case that the respective orientations of the transmission and reception sides are fixed.

Figure 3:
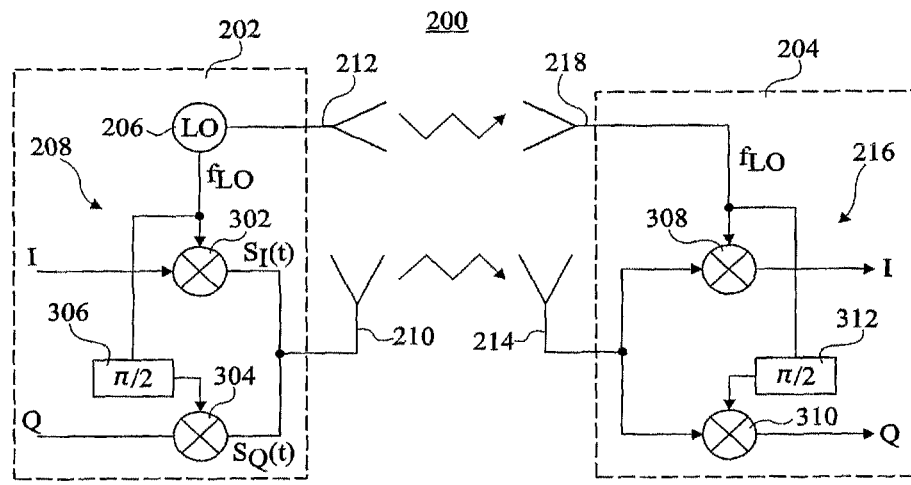
FIG. 3 illustrates a data transmission system according to another embodiment.

FIG. 3 illustrates the data transmission system 200 of FIG. 2 in more detail according to one example. Like features have been labelled with like reference numerals and will not be described again in detail.

In the example of FIG. 3, the data modulator 208 comprises a mixer 302, which receives the frequency signal $f_{LO}$ from the local oscillator 206. Mixer 302 multiplies the I component of the data signal by the frequency signal to generate a component $S_I(t)$ of the modulated data signal S(t). The frequency signal $f_{LO}$ is also provided to a mixer 304 via a quarter-period phase shifter 306. Mixer 304 multiplies the Q component of the data signal by the shifted frequency signal, to generate a component $S_Q(t)$ of the modulated data signal S(t). The signals $S_I(t)$ and $S_Q(t)$ are summed to form the modulated data signal S(t) for transmission on the antenna 210.

On the reception side 204, the data demodulator 216 comprises a mixer 308, which multiplies the modulated data signal S'(t) received via antenna 214 with the frequency signal $f_{LO}$ received via antenna 218, to provide the I component of the data signal. The modulated data signal S'(t) received via antenna 214 is also provided to a mixer 310. Mixer 310 multiples this signal by the frequency signal $f_{LO}$ after a quarter-period phase shift has been applied by phase shifter 312, to provide the Q component of the data signal.

Figure 4:
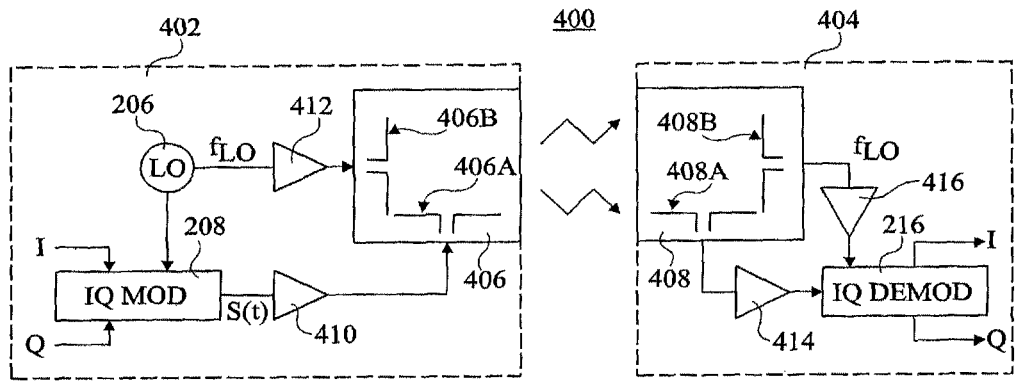
FIG. 4 illustrates a data transmission system according to another embodiment.

FIG. 4 illustrates a data transmission system 400, which is similar to the transmission system 200 of FIG. 2, and again like features are labelled with like reference numerals and will not be described again in detail.

However, in FIG. 4, the antennas on the transmission and reception sides 402, 404 are implemented by antenna patches 406 and 408 respectively. Each of the patches 406, 408 comprises a built-in horizontal antenna 406A, 408A and a built-in vertical antenna 406B, 408B respectively. Alternatively, rather than comprising separate antennas, the antenna patches 406, 408 could each comprise a single element that forms both antennas.

On the transmission side 402, the modulated data signal S(t) is provided to the horizontal antenna 406A of patch 406 via an amplifier 410, while the frequency signal $f_{LO}$ is provided to the vertical antenna 406B of the patch 406 via an amplifier 412.

Similarly, on the reception side 404, the modulated data signal S'(t) is provided to the data demodulator 216 from the horizontal antenna 408A of patch 408 and via an amplifier 414, while the frequency signal $f_{LO}$ is provided to the data demodulator 216 from the vertical antenna 408B and via an amplifier 416.

In alternative embodiments, the modulated data signal could be transmitted and received via the vertical antennas of patches 406, 408, and the frequency signal could be transmitted and received via the horizontal antennas of patches 406, 408.

Figure 5:
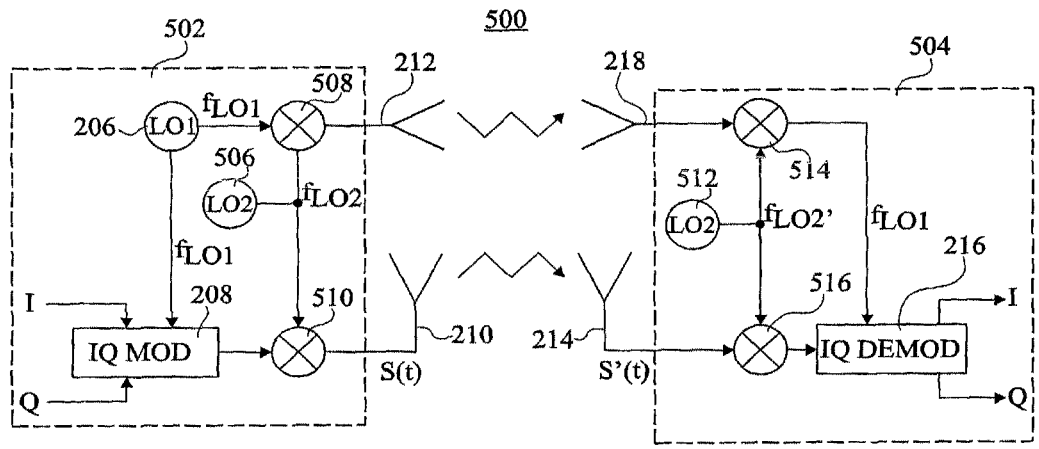
FIG. 5 illustrates a data transmission system according to another embodiment.

FIG. 5 illustrates another embodiment of a data transmission system 500, which is similar to the system 200 of FIG. 2, and like features are labelled with like reference numerals and will not be described again in detail.

With respect the system 200 of FIG. 3, the system 500 additionally comprises, on the transmission side 502, a second local oscillator 506 and a pair of mixers 508, 510, and on the reception side, a second local oscillator 512 and a pair of mixers 514 and 516. In FIG. 5, the frequency signal generated by local oscillator 206 on the transmission side and received by the demodulator 216 on the reception side is labelled $f_{LO1}$.

On the transmission side, oscillator 506 generates a frequency signal $f_{LO2}$, which is provided to the mixers 508 and 510. Mixer 508 multiplies the signal $f_{LO2}$ by the signal $f_{LO1}$ generated by local oscillator 206, and provides the output to the antenna 212. Mixer 510 multiplies the signal $f_{LO2}$ by the output of the modulator 208, to provide the signal S(t) for transmission via antenna 210.

On the reception side 504, oscillator 512 generates a frequency signal $f_{LO2}'$, which is provided to mixers 514 and 516. Mixer 514 multiples signal $f_{LO2}'$ by the signal received via antenna 218, to retrieve the frequency signal $f_{LO1}$, which is provided to demodulator 216. Mixer 516 multiples the signal $f_{LO2}'$ by the signal S'(t) received via antenna 214 to retrieve the modulated data signal, which is also provided to the demodulator 216.

The mixers 508, 510 provide an additional up conversion of the frequency and data signals prior to transmission, while the mixers 514 and 516 provide corresponding down conversion on the reception side. This allows a greater transmission distance between the reception and transmission sides. The local oscillators 506 and 512 may be selected to provide frequency signals of the same frequency. However, they are, for example, implemented by a free-running VCO (voltage controlled oscillator), and can be permitted to have relatively poor frequency stability and/or noise characteristics, meaning that the frequencies of the signals may vary to some extent over time.

Figure 6:
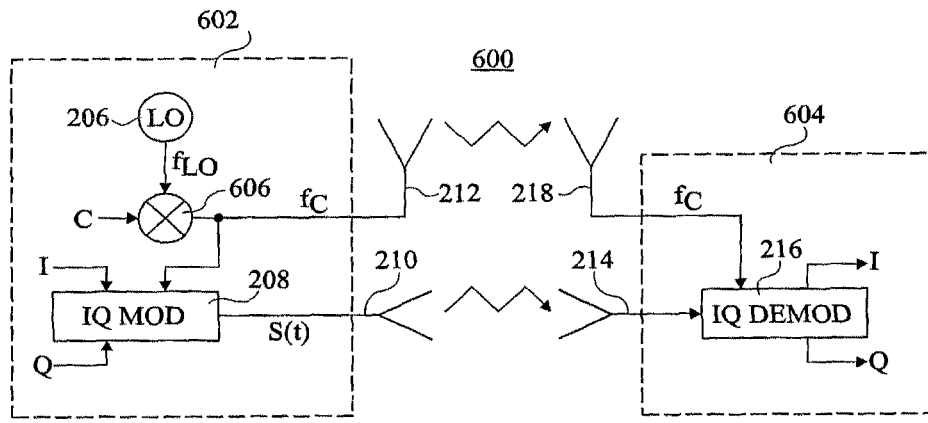
FIG. 6 illustrates a data transmission system according to another embodiment.

FIG. 6 illustrates a further embodiment of a data transmission system 600, which is again similar to the system 200 of FIG. 2, and like features have been labelled with like reference numerals and will not be described again in detail.

The transmission system 600 comprises a transmission side 602 and a reception side 604. The transmission side 602 comprises a mixer 606, which receives a code signal C, and multiplies this signal by frequency signal $f_{LO}$ from the local oscillator 206 to generate a frequency signal $f_C$. The code signal C for example comprises a random code, that enables the frequency spectrum of the carrier frequency signal to be spread out. For example, the code signal modulates the phase of the frequency signal $f_{LO}$ provided by the local oscillator 206. The code signal is for example a random signal synchronized with the data signals I and Q and having the same data rate as the signals I and Q. The data rate of the code signal C is for example substantially equal to that of the data signal I,Q, such that the modulation speed of the frequency signal $f_C$ is for example substantially equal to that of the modulated data signal.

The modified frequency signal $f_C$ is then used by the data modulator 202 to modulate the data signals I and Q, and provide the modulated signal S(t). Furthermore, it is the modified frequency signal $f_C$ that is transmitted via the antenna 212.

On the reception side 604, the modified frequency signal $f_C$ is received via antenna 218 and is used by the data demodulator 216 to demodulate the received modulated data signal S'(t).

An advantage of the embodiment of FIG. 6 is that the modified frequency signal $f_C$ has an energy that is dispersed across a relatively broad frequency bandwidth. Advantageously, the power spectral density of the resulting carrier frequency signal is then similar to that of the modulated data signal S(t), as will now be explained with reference to the graphs of FIGS. 8A to 8C.

Figure 8A:
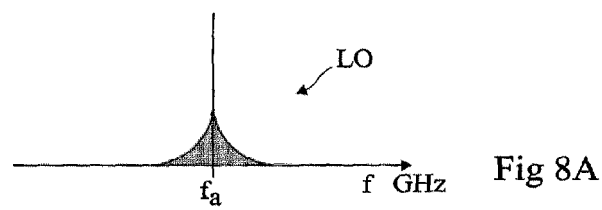
FIGS. 8A to 8C are graphs illustrating the frequency spectrums of transmitted frequency and data signals according to some embodiments.

FIG. 8A illustrates the frequency spectrum of the frequency signal $f_{LO}$ as transmitted according to the embodiment of FIG. 2, which has a peak at the frequency $f_a$ of the frequency signal $f_{LO}$.

Figure 8B:
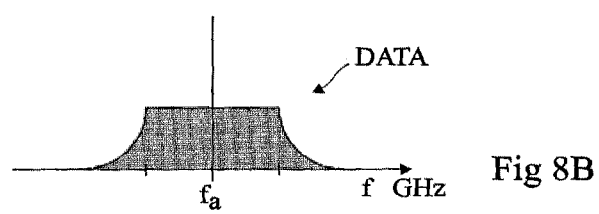

FIG. 8B illustrates the frequency spectrum of the data signal, having a relatively broad spectrum, based on the data.

Figure 8C:
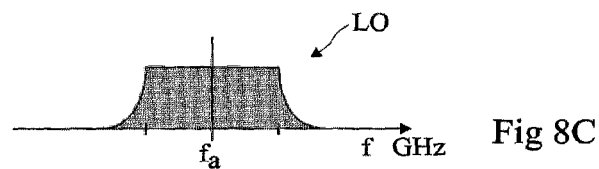

FIG. 8C illustrates the frequency spectrum of the frequency signal $f_{LO1}$ after mixing by mixer 508 according to the embodiment of FIG. 5. As illustrated, due to the random nature of the code C, and the fact that a similar data rate to the I and Q data signals is chosen, the frequency spectrum is very similar to that of the data as shown in FIG. 8B. Furthermore, the power spectral density of the frequency signal is modified by the code signal.

Figure 7:
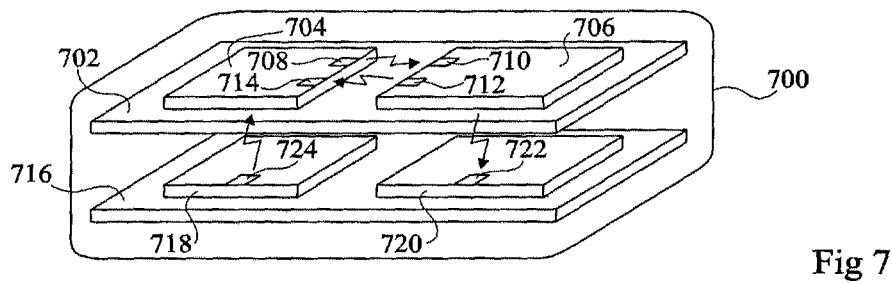
FIG. 7 illustrates an electronic device comprising transmission systems according to another embodiment.

FIG. 7 illustrates an electronic device 700 according to one embodiment in which wireless data transmission systems as described herein are incorporated. In particular, the device 700 comprises a first circuit board 702, comprising chips 704 and 706. The chips 704 and 706 in this example communicate by wireless interfaces. In particular, one wireless data transmission system is provided by a transmission side 708 on chip 704 and a reception side 710 on chip 706. Another wireless data transmission system is provided by a transmission side 712 on chip 706, and reception side 714 on chip 704. The transmission sides 708, 712 and the reception sides 710, 714 may be provided by those of any of the embodiments of FIGS. 2 to 6 described above.

The device 700 also comprises a circuit board 716 stacked below the circuit board 702, and in this example comprising chips 718 and 720. Chip 718 is for example positioned below chip 704, and transmits data to it from a transmission side 724 on chip 718 to a corresponding reception side (not illustrated) on chip 704. The chip 706 for example transmits data to the chip 720 from a transmission side (not illustrated) on chip 706 to reception side 722 on chip 720. Again, these transmission and reception sides may be provided by those of any of the embodiments of FIGS. 2 to 6 described above.

The device 700 is for example a PC (personal computer), laptop computer, video decoder or other electronic device in which wireless data interfaces between chips may be implemented. Alternatively, the embodiments described herein could be used for wireless data transmission between chips of separate electronics devices, which may or may not be mobile devices.

An advantage of the embodiments described herein is that the transmission circuitry and reception circuitry of the wireless data transmission system are of relatively low complexity, and furthermore data transmission of relatively low error rate is possible. Indeed, the transmission of a preamble for synchronization may be avoided, and the ADC 120 and digital circuitry 122 of FIG. 1 may be omitted.

Having thus described at least one illustrative embodiment, various alterations, modifications and improvements will readily occur to those skilled in the art.

For example, it will be apparent to those skilled in the art that the various features described in relation with each of the embodiments could be combined in alternative embodiments in any combination.

Furthermore, it will be apparent that, while a number of examples of types of antenna and data transmission have been described, in alternative embodiments other types would be possible.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A wireless data transmitter comprising:
    a local oscillator configured to generate an initial frequency signal;
    a mixer configured to generate a frequency signal based upon said initial frequency signal and a frequency spreading code signal, the frequency spreading code signal being based upon a random code;
    a modulator configured to modulate a data signal based on said frequency signal; and
    first and second antennas directly coupled to said modulator and said mixer, respectively, said first and second antennas configured to transmit said modulated data signal and said frequency signal independently, the data signal and the frequency spreading code signal having a same code rate.

2. The wireless data transmitter of claim 1, wherein said data signal comprises in-phase (I) and quadrature (Q) components.

3. The wireless data transmitter of claim 1, wherein said first and second antennas are configured to transmit said modulated signal using a first type of polarization, and said frequency signal using a second type of polarization different from said first polarization.

4. The wireless data transmitter of claim 1, wherein the frequency signal is configured to have energy spread over a plurality of spectra.

5. The wireless data transmitter of claim 3, wherein said first type of polarization is one of horizontal and vertical polarization, and said second type of polarization is the other of horizontal and vertical polarization.

6. The wireless data transmitter of claim 3, wherein said first type of polarization is one of clockwise and anti-clockwise circular polarization, and said second type of polarization is the other of clockwise and anti-clockwise circular polarization.

7. A method of wireless data transmission comprising:
    generating by a local oscillator an initial frequency signal;
    generating by a mixer a frequency signal by mixing said initial frequency signal and a frequency spreading code signal, the frequency spreading code signal being based upon a random code;
    modulating by a modulator a data signal based on said frequency signal; and
    transmitting said modulated data signal and said frequency signal via first and second antennas directly and respectively coupled to the modulator and the mixer, the data signal and the frequency spreading code signal having a same code rate.

8. The method of claim 7, further comprising synchronizing the frequency signal with the data signal.

* * * * *